UNITED STATES PATENT OFFICE.

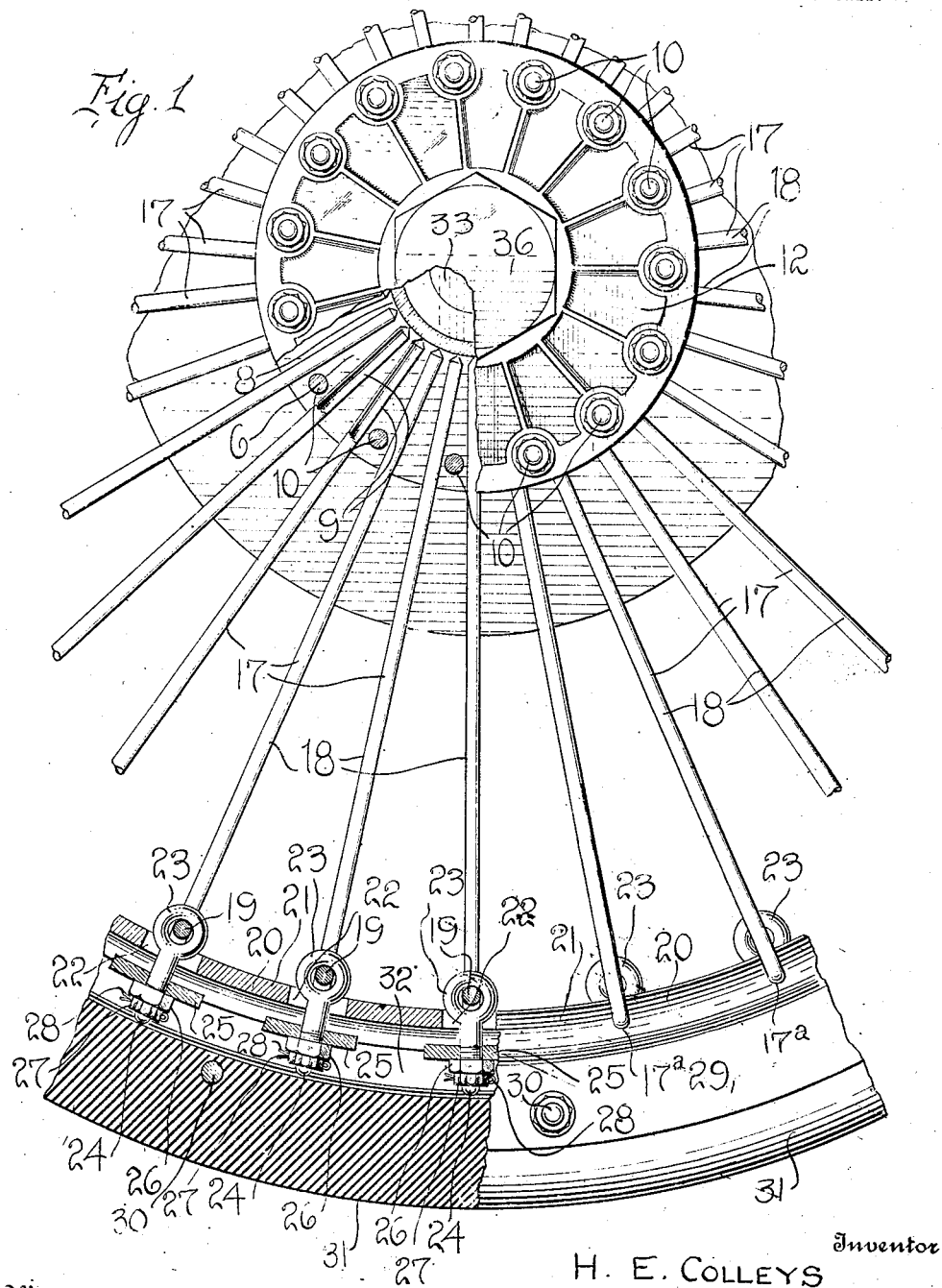

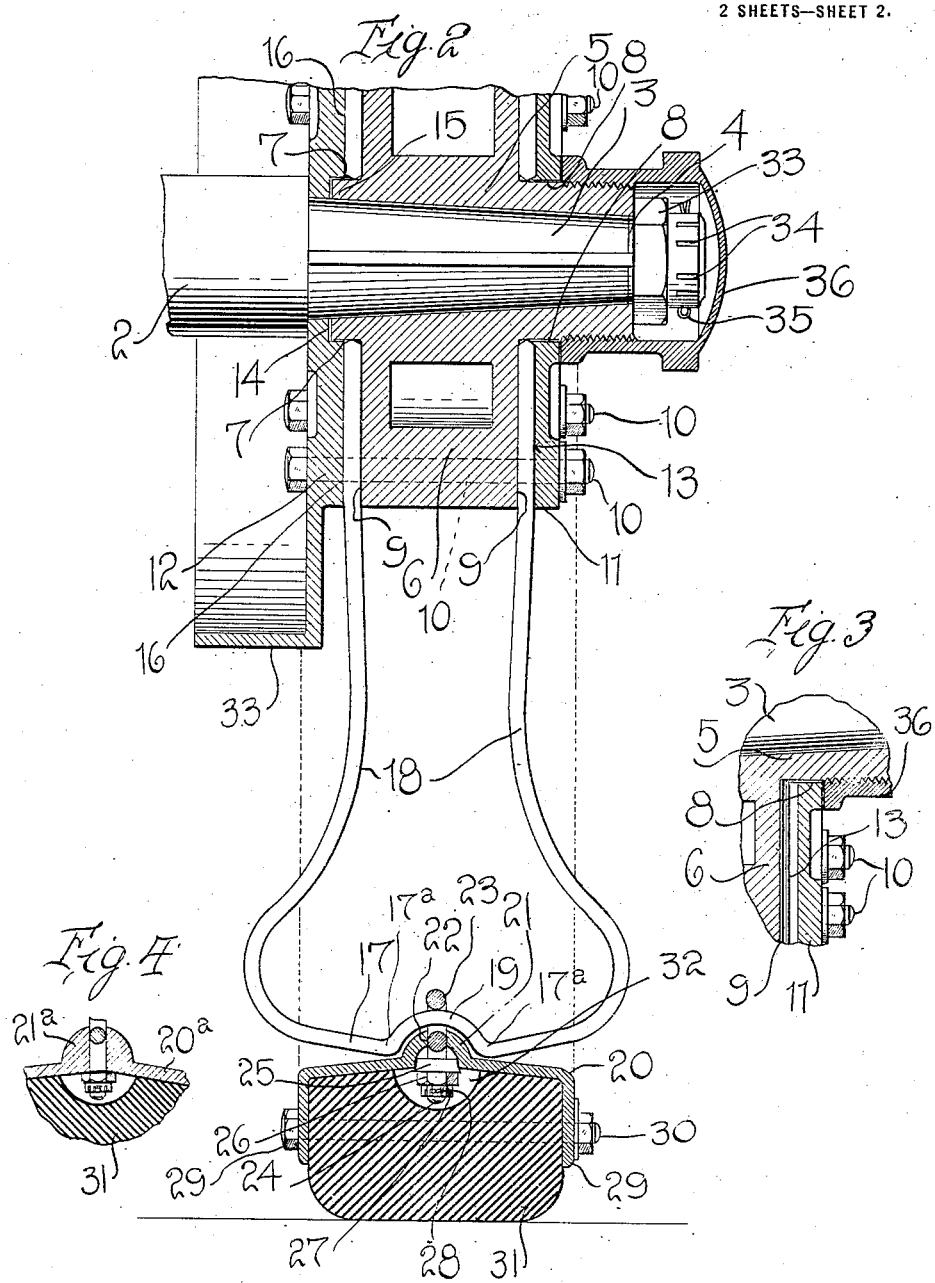

HENRY E. COLLEYS, OF HAMMOND, INDIANA.

RESILIENT WHEEL.

1,178,053.   Specification of Letters Patent.   Patented Apr. 4, 1916.

Application filed January 9, 1915. Serial No. 1,364.

*To all whom it may concern:*

Be it known that I, HENRY E. COLLEYS, a citizen of the United States, residing at Hammond, in the county of Lake and State of Indiana, have invented certain new and useful Improvements in Resilient Wheels, of which the following is a specification, reference being had to the accompanying drawings.

My invention relates to vehicle wheels, and particularly to resilient wheels designed to take the place of wheels equipped with the ordinary rubber or pneumatic tires.

The primary object of my invention is the provision of a very simple resilient wheel which shall be thoroughly effective in action, very durable, and which shall be extremely simple in construction.

A further object of the invention is the provision of a resilient wheel so constructed that any of the spokes may be removed and replaced with relative ease, and that in case any of the spokes are broken they may be temporarily cut off short, close to the hub and rims so that they shall not foul any part of the vehicle and so that the wheel may be used until repairs may be conveniently made.

A further object is to so construct the wheel that the shearing strain coming upon the clamp bolts holding the spokes to the hub may be also borne by the spokes themselves.

Still another object is to so construct the wheel that the repairs can be made without special tools or experience.

Other objects will appear in the course of the following description.

My invention is illustrated in the accompanying drawings, wherein—

Figure 1 is a fragmentary side elevation of a vehicle wheel constructed in accordance with my invention, some of the parts being broken away and some of the parts being in section. Fig. 2 is a vertical section through the wheel shown in Fig. 1. Fig. 3 is a fragmentary transverse section showing a portion of the annulus 6 and the hub, and also showing the outer clamp plate, the spokes not being in place; Fig. 4 is a fragmentary transverse sectional view showing a modified form of rim or felly.

Referring to these drawings, and particularly to Fig. 2, 2 designates an axle of any suitable character having the tapering spindle 3 which is exteriorly screw threaded at its outer end as at 4.

Mounted upon the axle 3 and either fixed thereto or rotating independently thereof, as occasion may require, is a hub 5. The interior of this hub is of course tapering to fit upon the tapering spindle 3. This hub is formed with the annular projecting portion 6 which is preferably for the sake of lightness made hollow, and on each side of such projecting portion 6 the hub is formed with the seats 7 and 8. The outer and inner faces of the annular portion 6 are provided with a series of radially disposed spoke seats 9, and between these seats are transverse passages for the reception of certain bolts 10 hereinafter referred to.

Coacting with the annular portion 6 are the outer and inner clamp plates 11 and 12, respectively. The outer clamp plate 11 is formed with a plurality of radially disposed spoke seats 13 which are semi-circular in cross section and which complement the spoke seats 9 on the confronting face of the annulus 6. The clamp plate 12 is also formed to fit over, surround and snugly fit the base of the spindle 3, and is formed with a recess 14 to accommodate the projecting end 15 of the hub 5. The inner face of the clamp plate 12 is formed with a plurality of radially disposed recesses semicircular in cross section, forming the seats 16 complementing the seats 9 formed upon the adjacent face of the annulus 6. Disposed within these seats 9 and 16 are the inner ends of the resilient spokes designated generally 17. The spokes are made up of a plurality of resilient rods, each of which is bent at its middle into approximate U-shape so as to provide a medially disposed portion adapted to engage with the felly of the wheel, and two legs 18 which extend upward parallel to each other, one of these legs being disposed in the corresponding seat upon the outer face of the annulus 6 and the other upon the corresponding seat upon the inner face of the annulus. Each member 17 at its middle, that is, at its outer end, is transversely inwardly bent as at 19, the two legs extending laterally and slightly inward from this middle bend, then being curved inward and toward each other, as shown most clearly in Fig. 2.

Thus the outer portion of the spoke is so formed as to provide a relatively wide open loop portion which thus provides sufficient resilience for the outer ends of the spoke.

The felly 20 is of metal and may be pressed, cast, or otherwise formed. It is approximately U-shape in cross section and at its middle plane is formed with an inwardly projecting rib 21 which at intervals is slotted as at 22 in order to accommodate the eyes 23 formed upon eye bolts 24, the shanks of these bolts passing inward through these slots 22 and through washers 25 which, as illustrated in Fig. 2, extend across the space at the base of the rib 21 and have beveled lateral faces so as to have wedging engagement with the base of the rib and provide a firm bearing for the shanks of the eye bolts. Each eye bolt is of course screw threaded at its exterior end and carries a nut 26. This nut is castellated, that is, provided with a dentated annulus 27 through any of whose notches passes a cotter pin 28, which cotter pin passes through an opening in the bolt by which the nut is locked in any desired adjusted position. It will be noted that the rib 21 fits snugly into the bend 19 of each spoke, and that the rim therefore has snug engagement with the spokes by the action of the eye bolts 24. As before stated, the rim or felly 20 is of metal and approximately U-shape in cross section so as to provide the sides 29 through which pass bolts 30, these bolts holding the tire 31 in place. This tire may be made of solid rubber or any other suitable material, the inner face of the tire being formed with a groove 32 to accommodate the projecting ends of the eye bolts 24.

The inner ends of the spoke legs are held in position on the annulus 6 by the clamp plates 11 and 12, these plates in turn being held in engagement with the hub by means of the transverse bolts 10 previously described. Thus the spokes are held rigidly in position.

The outer end of the spindle 3 is screw threaded for the reception of a castellated nut 33 which bears against the annular hub 5 and holds it firmly in position upon the spindle 3. This castellated nut is formed with a plurality of slots 34 through which a cotter pin 35 passes, and inclosing this nut and having screw threaded engagement with the spindle is a cap nut 36. Of course I do not wish to be limited to this manner of holding the hub upon the spindle. If a wheel is designed to be used with a brake drum, the brake drum designated 33 is preferably cast upon the inner clamping member 12, and it will be noted that the bolts 10 are relieved of the shearing strain produced by the brake by the engagement of the inside spoke ends with the plate 12, these spoke ends acting as keys. If it is desired that the wheel revolve on its axis the hub may be made to receive a bushing, and a lock nut may be used instead of a cap nut on the outside end of the hub. Of course it is obvious that the spoke may be formed to different radii than shown in order to suit different classes of service and that the shape of the spokes may be varied and also that a greater or less number of bolts 10 and 30 may be used on the hub and rim, depending on the size and strength of the wheel. Instead of the rib 21 being pressed out of the material of the rim a solid rib might be used, as illustrated in Fig. 4, where 20ª designates the rim and 21ª the rib.

It will be seen that a solid tire might be used with my wheel, and thus the defects common to inflated tires may be obviated. The wheel is so simply made that the total cost of the wheel and tire will be less than that of an inflated tire wheel. The wheel is strong, durable, and being made entirely of metal is not affected by heat or dampness. One or more spokes may be broken or damaged without impairing the strength of the wheel surrounding the rim, and the loose ends of the broken spokes may be cut off close to the rim so that these ends will not foul any part of the vehicle. Because of the elastic nature of the spokes the wheel will have sufficient resilience to make it easy riding, and it may be particularly noted at this point that the formation of the outer end of each spoke is such that the spoke only bears at the points 17ª against the rim, and that from these points 17ª each spoke extends laterally outward and toward the center of the wheel. Thus as the spoke is deflected under loads the two portions on each side of the point 17ª will be forced inward against the resilience of the wire, thus deadening any shock.

Having described my invention, what I claim is:

1. A wheel of the character described comprising a hub, a plurality of approximately U-shaped spokes operatively connected with the hub and extending radially therefrom, each of said spokes being formed of a length of resilient metal, the middle outer portion of the spoke being formed to provide a medially disposed inwardly extending semicircular bend, a rim having a medially disposed circumferentially extending rib upon its inner face engaging in the medially disposed bends of the spokes, a tire carried by the rim, and eye bolts connected to said rim and extending through the rib and through the eyes of which said spokes pass.

2. In a resilient wheel, a plurality of radially extending U-shaped spokes, the outer ends of the spokes being formed with transverse centrally extending bends, an approximately U-shaped rim having a medially disposed centrally extending rib snugly engaging in said bends, eye bolts passing through the rim, the rim being slotted to accommodate the eyes of said eye bolts, spokes passing through said eyes, nuts upon the inner ends of the eye bolts, a tire having a groove upon its inner face adapted to accommodate said nuts, said tire fitting within the rim, and bolts passing transversely through the sides of the rim and through said tire.

3. In a resilient wheel, a hub, a plurality of U-shaped spokes having their legs operatively connected to the hub, each spoke being disposed wholly in a plane transverse to the circumference of the wheel, a rim, means detachably connecting the middle portion of the rim to the middle of the outer end of each spoke, each spoke on each side of said point of connection contacting with the rim and then extending in laterally divergent relation thereto whereby the spoke on each side of its point of contact with the rim may flex.

4. In a resilient wheel, radially disposed approximately U-shaped spokes, a rim, each spoke and the rim being formed one with a reëntrantly curved portion and the other with a curved portion concentric to said reëntrantly curved portion, and means detachably engaging the curved portion of each spoke with the curved portion of the rim, permitting those portions of the spokes on each side of the curved portion thereof to flex but connecting the spokes and the rim for unitary circumferential movement.

In testimony whereof I hereunto affix my signature in the presence of two witnesses.

HENRY E. COLLEYS.

Witnesses:
   PAUL B. LIPINSKI,
   B. GEHRING.